US012635623B2

(12) United States Patent
Laitinen et al.

(10) Patent No.: US 12,635,623 B2
(45) Date of Patent: May 26, 2026

(54) INTELLIGENT BOOM CONTROL WITH A HYDRAULIC STRAIGHT-LINE SYSTEM FOR A FELLER BUNCHER

(71) Applicant: Deere & Company, Moline, IL (US)

(72) Inventors: Simo Laitinen, Tampere (FI); Mikko Palmroth, Tampere (FI)

(73) Assignee: DEERE & COMPANY, Moline, IL (US)

( * ) Notice: Subject to any disclaimer, the term of this patent is extended or adjusted under 35 U.S.C. 154(b) by 76 days.

(21) Appl. No.: 18/798,353

(22) Filed: Aug. 8, 2024

(65) Prior Publication Data

US 2025/0048978 A1    Feb. 13, 2025

Related U.S. Application Data

(60) Provisional application No. 63/518,172, filed on Aug. 8, 2023.

(51) Int. Cl.
*A01G 23/081*        (2006.01)
(52) U.S. Cl.
CPC .................................. *A01G 23/081* (2013.01)
(58) Field of Classification Search
CPC .................................................... A01G 23/081
See application file for complete search history.

(56) References Cited

U.S. PATENT DOCUMENTS

| | | | |
|---|---|---|---|
| 9,297,148 B2 | 3/2016 | Stulen et al. | |
| 10,480,541 B2 | 11/2019 | Bellows et al. | |
| 10,844,572 B2 | 11/2020 | Bellows et al. | |
| 2015/0030424 A1* | 1/2015 | Stulen | B66C 23/54 414/680 |
| 2019/0010966 A1* | 1/2019 | Bellows | E02F 9/2296 |

* cited by examiner

*Primary Examiner* — Andrew J Cromer

(57) ABSTRACT

An intelligent boom control hydraulic system with a straight-line feature, for a feller buncher is disclosed. The system comprises a hoist hydraulic cylinder, a stick hydraulic cylinder, a hoist boom position sensor, a stick boom position sensor, a hydraulic fluid pump, a hydraulic reservoir including hydraulic fluid, and various valves. A hoist control valve controls flow from the hydraulic pump to the hoist hydraulic cylinder, and the hoist hydraulic cylinder to the hydraulic reservoir. A stick control valve controls flow from the hydraulic pump stick hydraulic cylinder, and the stick hydraulic cylinder to the hydraulic reservoir. A straight-line control valve the hoist hydraulic cylinder and the stick hydraulic cylinder. A microprocessor directs sends signals to control the hydraulic fluid flow through control valves based on target hoist stick boom velocities and a look up chart to select valve combinations to achieve the target hoist and stick boom velocities.

10 Claims, 4 Drawing Sheets

INTELLIGENT BOOM CONTROL WITH A HYDRAULIC STRAIGHT-LINE SYSTEM FOR A FELLER BUNCHER

RELATED APPLICATION

This document (including the drawings) claims priority and the benefit of the filing date based on U.S. provisional application No. 63/518,172, filed Aug. 8, 2023, and entitled INTELLIGENT BOOM CONTROL WITH A HYDRAU-LIC STRAIGHT-LINE SYSTEM FOR A FELLER BUNCHER under 35 U.S.C. § 119 (e), where the provisional application is hereby incorporated by reference herein.

TECHNICAL FIELD

The disclosure generally relates to intelligent boom control for a feller buncher with a hydraulic straight-line system.

BACKGROUND

For conventional boom hydraulic systems when operated, the operator inputs that control raising and lowering of the boom are taken as hydraulic flow signals directed to two actuators with minimal manipulation. This arrangement requires a significant level of operator skill to achieve linear constant velocity of the boom tip since the tip velocity is constantly changing as a function of the cylinder speeds, as the tip moves through the boom operating envelope. In many applications, such as felling trees with a feller buncher head, the operator wants to move the boom tip, and the end effector coupled to the stick boom at the stick pin, in a generally horizontal path. In these applications, it is desirable to make it easier for the operator to move the boom tip in this manner. Moving the boom tip in a generally horizontal path away from the machine requires lowering the hoist boom while simultaneously raising the stick boom. Thus, the operator would have to simultaneously coordinate movement of one joystick, or control mechanism, to control the stick boom cylinder through the stick control valve with another joystick. The hoist boom can be lowered by metering hydraulic fluid from the hoist hydraulic cylinder through an orifice in the hoist control valve, and back into the oil reservoir. The stick boom can be raised by pumping hydraulic fluid from the oil reservoir through the pump and the stick control valve into the stick hydraulic cylinder. Furthermore, conventional methods enable near horizontal boom tip for a narrow elevation range only. Therein lies any opportunity to improve when operating a feller buncher.

In this light, a control system for improved control near horizontal movement of the boom tip is needed.

SUMMARY

According to an aspect of the present disclosure an intelligent boom control hydraulic system with a straight-line feature, for a feller buncher is disclosed. The feller buncher includes a hoist boom, and a stick boom coupled to the hoist boom. The system comprises a hoist hydraulic cylinder for raising and lowering the hoist boom wherein the hoist hydraulic cylinder has a rod end and a base end. The system includes a stick hydraulic cylinder for raising and lowering the stick boom wherein the stick hydraulic cylinder having a rod end and base end. A hoist boom position sensor provides hoist boom position readings. A stick boom position sensor provides stick boom position readings. The system also includes hydraulic fluid pump, a hydraulic reservoir including hydraulic fluid, and various valves. A hoist control valve controls flow from the hydraulic pump to the base end of the hoist hydraulic cylinder, and controls flow from the rod end of the hoist hydraulic cylinder to the hydraulic reservoir. A stick control valve controls flow from the hydraulic pump to the base end of the stick hydraulic cylinder, and controls flow from the rod end of the stick hydraulic cylinder to the hydraulic reservoir. A straight-line control valve couples the rod end of the hoist hydraulic cylinder and the rod end of the stick hydraulic cylinder. The system also includes an operator input device for input of operator commands, and a microprocessor for computing control signals to direct hydraulic fluid flow through the hoist control valve, the stick control valve and the straight-line control valve based on a target hoist boom velocity and a target stick boom velocity derived from input signals from the operator input device, and a look up chart to select a valve combination to achieve the target hoist boom velocity and the target stick boom velocity.

The hoist boom position sensor is a hoist cylinder position sensor determining the length of the hoist hydraulic cylinder. The stick boom position is a stick cylinder position sensor determining the length of the stick hydraulic cylinder. The intelligent boom control hydraulic system further comprises a counterbalance valve with a first port controlling flow to the rod end of the stick hydraulic cylinder and a second port controlling flow to the rod end of the hoist hydraulic cylinder.

The intelligent boom control hydraulic system further comprises a straight-line activation valve for actuating the straight-line control valve and counterbalance valve to move the boom tip in a generally horizontal path.

In the system, no more than two of the hoist control valve, the stick control valve and the straight-line control valve are active during any operation.

The operator commands may further comprise of a first command from a first operator input device and a second command from a second operator input device, the first command enabling the operator to move the boom tip in a vertical direction, and the second command enabling the operator to move the boom tip in a generally horizontal path.

When extending the hoist hydraulic cylinder and extending the stick hydraulic cylinder simultaneously, the hoist control valve couples the hydraulic fluid pump to the base end of the hoist hydraulic cylinder and the stick control valve couples the hydraulic fluid pump to the base end of the stick hydraulic cylinder.

When retracting the hoist hydraulic cylinder and retracting the stick hydraulic cylinder simultaneously, the hoist control valve couples the hydraulic fluid pump to the rod end of the hoist hydraulic cylinder and the stick control valve couples the hydraulic fluid pump to the rod end of the stick hydraulic cylinder.

When retracting the hoist hydraulic cylinder and extending the stick hydraulic cylinder simultaneously, the hoist control valve couples the hydraulic fluid pump to the rod end of the hoist hydraulic cylinder activating the counterbalance valve and allowing hydraulic fluid to flow from the base end of the hoist hydraulic cylinder to the base end of the stick hydraulic cylinder extending the stick hydraulic cylinder and pushing the hydraulic fluid from the rod end of the stick hydraulic cylinder through the straight-line control valve to the hydraulic reservoir.

When when retracting the stick hydraulic cylinder and extending the hoist hydraulic cylinder simultaneously, the stick control valve couples the hydraulic fluid pump to the rod end of the stick hydraulic cylinder activating the counterbalance valve and allowing hydraulic fluid to flow from the base end of the stick hydraulic cylinder to the base end of the hoist hydraulic cylinder extending the hoist hydraulic cylinder and pushing hydraulic fluid from the rod end of the hoist hydraulic cylinder through the straight-line control valve to the hydraulic reservoir.

The above features and advantages and other features and advantages of the present teachings are readily apparent from the following detailed description of the best modes for carrying out the teachings when taken in connection with the accompanying drawings.

DETAILED DESCRIPTION

Figure 1:
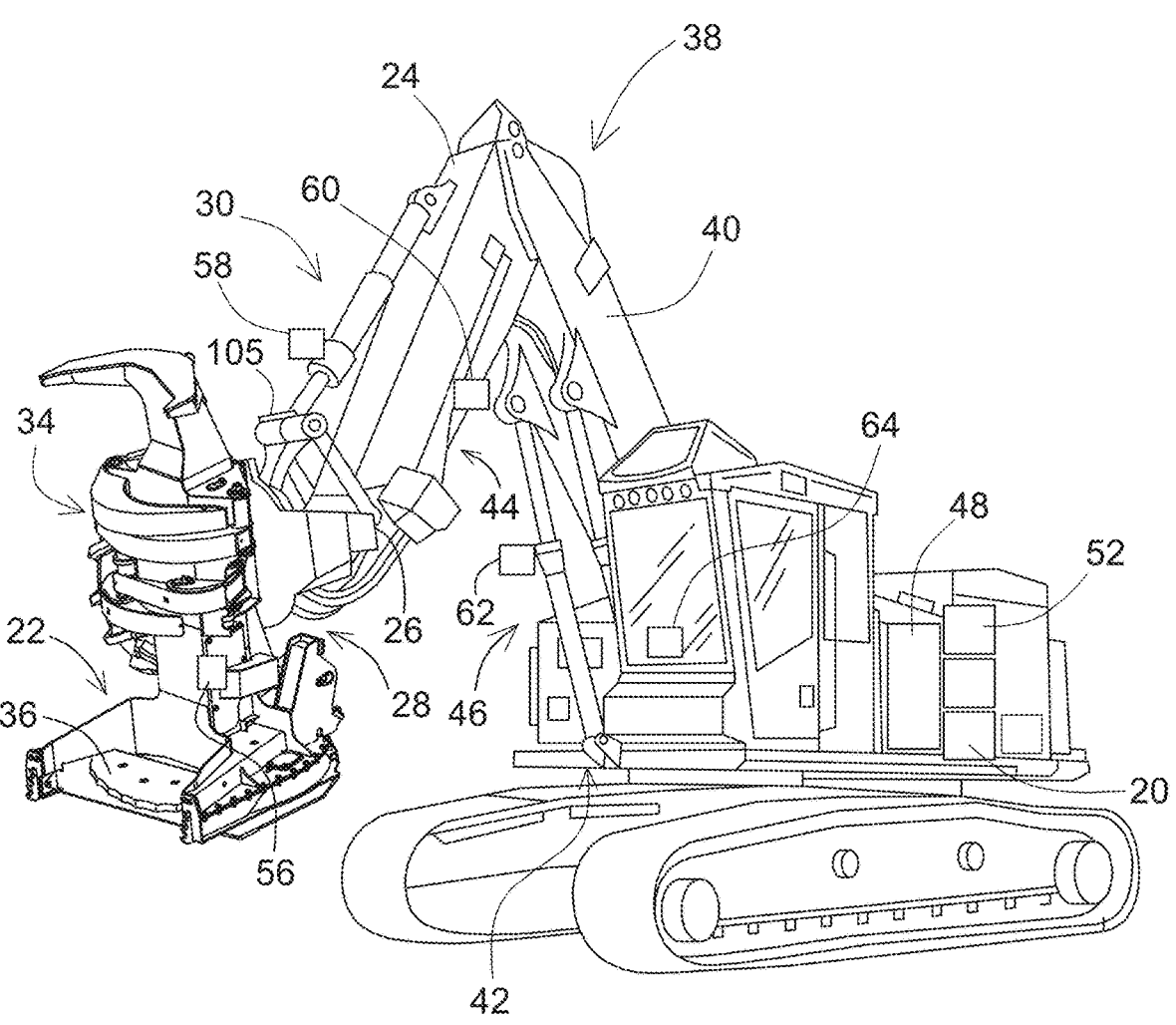
FIG. 1 is a perspective view of an example work machine with a boom tip, in the form of a tracked feller buncher having a felling head mounted to a boom assembly.

The following describes one or more example implementations of the disclosed system 100 for control of boom tip 105 movement, as shown in the accompanying figures of the drawings described briefly above. Generally, the disclosed control system 100 (and work vehicles on which they are implemented) allow for improved operator control of the movement of boom tip 105, as compared to conventional intelligent boom control systems.

A controller 52 (or multiple controllers) may be provided, for control of various aspects of the operation of the feller buncher, in general). The controller 52 (or others) may be configured as a computing device with associated microprocessors 20 and memory architectures, as a hard-wired computing circuit (or circuits), as a programmable circuit, as a hydraulic, electrical or electro-hydraulic controller, or otherwise. As such, the controller 52 may be configured to execute various computational and control functionality with respect to the feller buncher 20 (or other machinery). In some embodiments, the controller 52 may be configured to receive input signals in various formats (e.g., as hydraulic signals, voltage signals, current signals, and so on), and to output command signals in various formats (e.g., as hydraulic signals, voltage signals, current signals, mechanical movements, and so on). In some embodiments, the controller 52 (or a portion thereof) may be configured as an assembly of hydraulic components (e.g., valves, flow lines, pistons and cylinders, and so on), such that control of various devices (e.g., pumps or motors) may be affected with, and based upon, hydraulic, mechanical, or other signals and movements.

Figure 2:
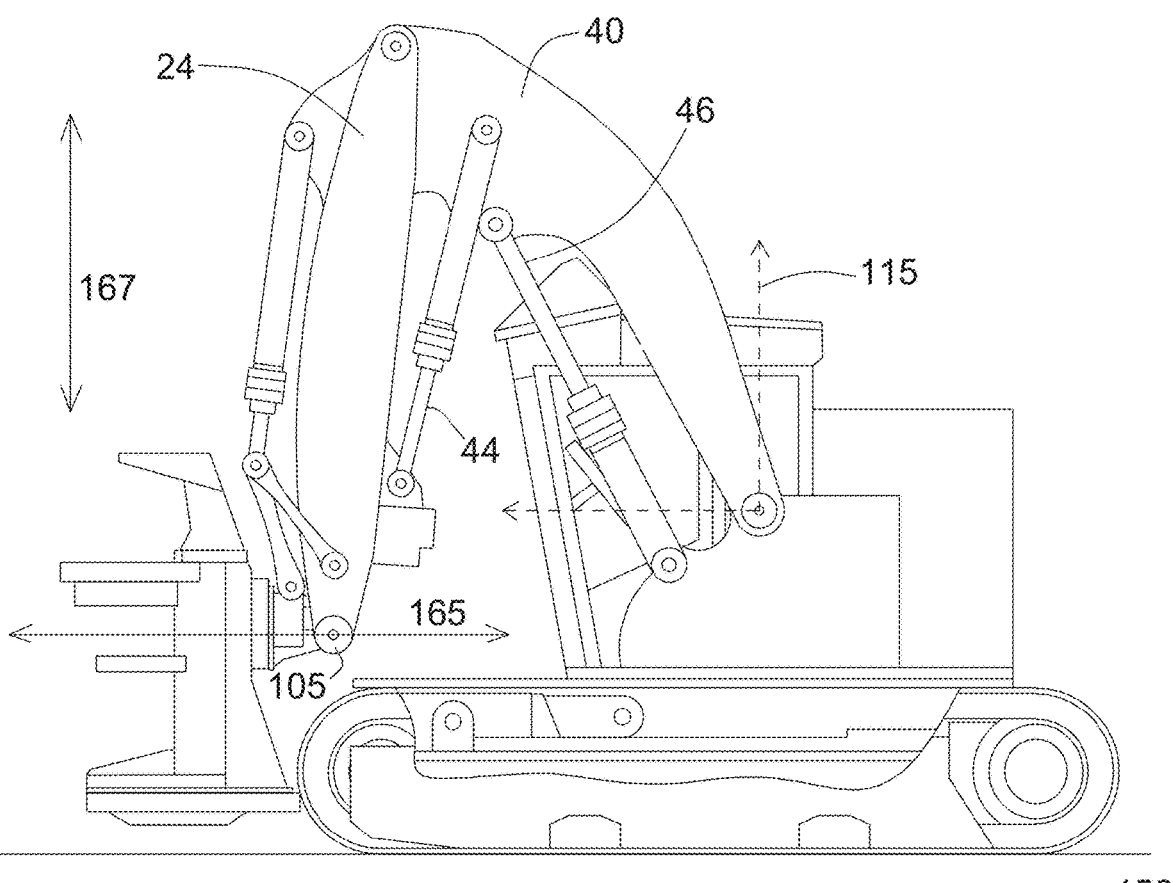
FIG. 2 is a side schematic view of the feller buncher of FIG. 1.
Figure 3:
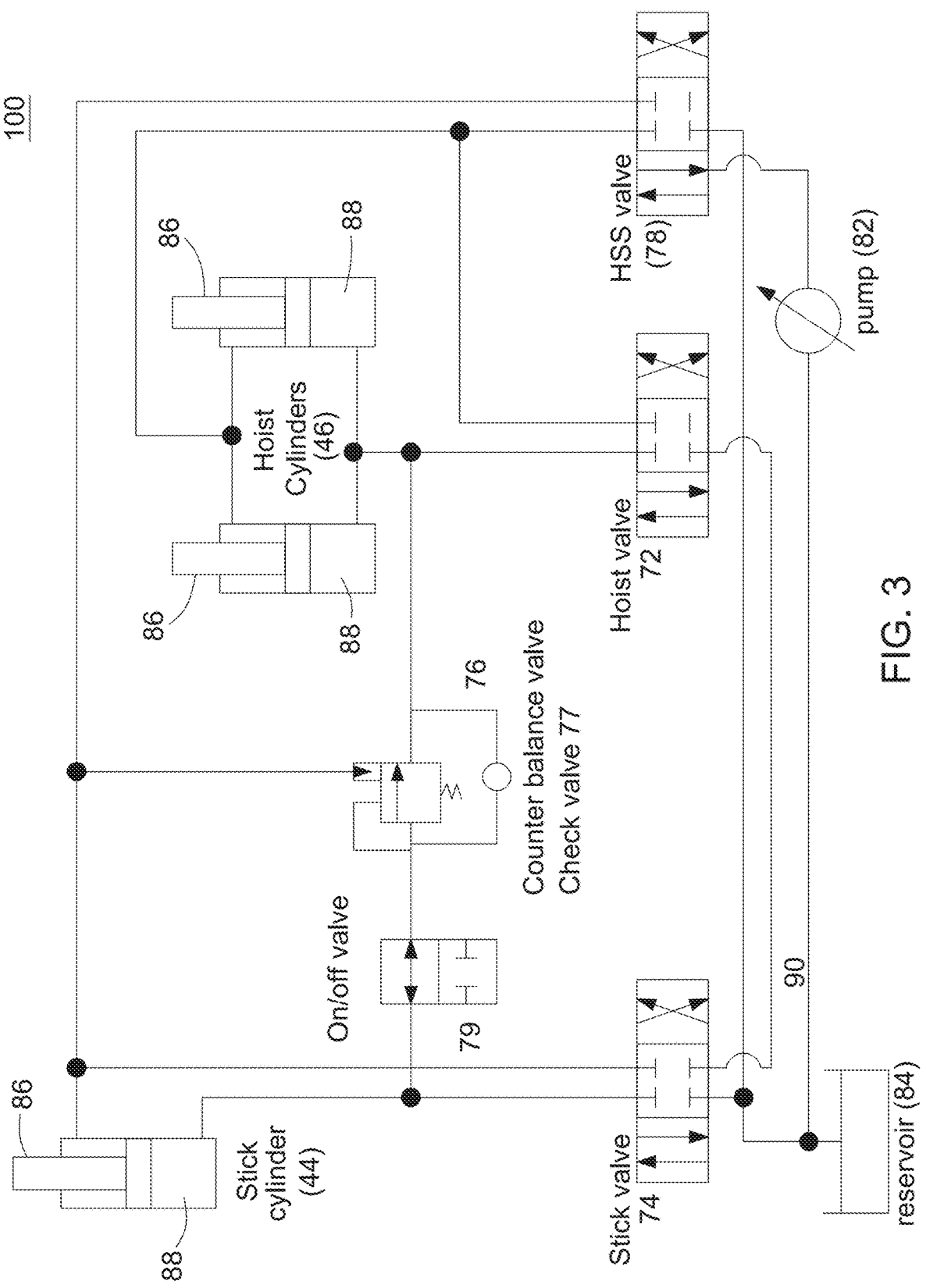
FIG. 3 is a schematic of the intelligent boom control hydraulic system.

Now turning to FIGS. 1 through 3, a boom tip 105 may be supported with respect to a work vehicle (or other work machine) by a boom assembly 38 and the boom assembly may be moved by various actuators in order to accomplish tasks with the boom tip 105. Discussion herein may sometimes focus on the example application of moving a boom tip 105 configured as a felling head 22 for a feller buncher, with actuators for moving the felling head 22 generally configured as hydraulic actuators. In other applications, other configurations are also possible. In some embodiments, for example, sprayers, claws, grapples, or other devices may also couple to a boom tip 105.

The disclosed intelligent boom control hydraulic system 100 may be used to receive command signals 110 for movement of a boom tip 105 specifying a desired velocity of the boom tip 105 relative to a reference frame 115. The system 100 may then determine velocity commands 120 for various actuators such that the commanded movement of the actuators provides the commanded movement of the boom tip 105. In this way, an operator command along a limited number of degrees of freedom may be converted to commands for relatively complex movement of multiple actuators, in order to provide the desired movement of the boom tip 105. This may generally permit intuitive operator input, in that an operator may directly indicate a desired movement (e.g., velocity) for the boom tip 105, relative to a reference frame, rather than attempting to provide distinct actuator commands that would result in a desired movement of the boom tip 105.

Generally, a boom assembly 38 may include at least two booms that are separately controllable by distinct actuators. For example, a first boom 40 (i.e. hoist boom) of a boom assembly 38 may be attached to a frame 42 of the work vehicle, and may be moved (e.g., pivoted) relative to the frame 42 by a first actuator 46 (i.e. hoist hydraulic actuator). A second boom 24 (i.e. stick boom) of the boom assembly 38 may be coupled to the first boom 40, and may be moved (e.g., pivoted) relative to the first boom 40 by a second actuator 44 (i.e. stick hydraulic actuator). The end effector may be attached to the second boom 24 and, in some embodiments, may be moved (e.g., pivoted) relative to the second boom 24 by a third actuator 30. In this way, distinct movements of the first 46, second 44, and third actuators 30 may correspond to distinct movements of the first boom 40, second boom 24, and an end effector, respectively. Further, due to the configuration of the boom assembly 38, a movement of the first boom 40 may cause a corresponding movement of the second boom 24 and the end effector relative to the vehicle frame 42, and a movement of the second boom 24 may cause a corresponding movement of the end effector relative to the first boom 40.

The following describes one or more example implementations of the disclosed system for control of the boom tip 105, as shown in the accompanying figures of the drawings described briefly above. Generally, the disclosed control system allows for improved operator control of the boom tip 105 in a straight-line fashion, as compared to conventional intelligent boom control systems.

The boom assembly 38 may be moved by various actuators in order to accomplish tasks with the boom tip. Discussion herein focuses on the application of the system 100 to feller bunchers and their use of felling heads. In other applications, other configurations are also possible. In some embodiments, for example, sprayers, claws, grapples, or other devices may also be configured with a movable boom tip. Likewise, work machines in some embodiments may be configured as excavators or other diggers, as skidders, or in various other ways.

The disclosed intelligent boom control hydraulic system 100 as applied to a feller buncher may be used to receive velocity commands for movement of a boom tip 105 specifying a desired velocity of the boom tip relative to a reference frame 115. The system 100 may then determine velocity commands for various actuators such that the commanded movement of the actuators provides the commanded movement of the boom tip 105. In this way, operator input along a limited number of degrees of freedom may be converted to commands for relatively complex movement of multiple actuators, in order to provide the desired movement of the end effector. This may generally permit intuitive operator input, in that an operator may directly indicate a desired movement (e.g., velocity) for the boom tip 105, relative to a reference frame 105, rather than attempting to provide distinct actuator commands that would result in a desired movement of the boom tip. As such, an operator may cause relatively precise movement of the boom tip, without a detailed appreciation of a movement envelope or a mapping of the boom tip position within the envelope relative to the input device movement.

As shown in FIG. 3, the intelligent boom control hydraulic system 100 comprises a two hoist hydraulic cylinders 46 for raising and lowering the hoist boom 40 wherein the hoist hydraulic cylinder 46 has a rod end 86 and base end 88. The system 100 also comprises a stick hydraulic cylinder 44 for raising and lowering the stick boom 24 wherein the stick hydraulic cylinder 44 includes a rod end 86 and a base end 88. The system 100 further comprises a hoist boom position sensor 62 providing hoist boom position readings, a stick boom position sensor 60 for providing stick boom position readings, a hydraulic fluid pump 82, and a hydraulic reservoir 84 including hydraulic fluid 90. The system 100 also includes a hoist control valve 72 for controlling flow from the hydraulic pump 82 to the base end 88 of the hoist hydraulic cylinder 46 and controlling flow from the rod end 86 of the hoist hydraulic cylinder 46 to the hydraulic reservoir 84. The system 100 includes a stick control valve 74 that controls flow from the hydraulic pump 82 to the base end 88 of the stick hydraulic cylinder 44, and the rod end 86 of the of stick hydraulic cylinder 44 to the hydraulic reservoir 84. The system 100 includes a straight-line control valve 78 (also referred to as HSS) for coupling the rod end 86 of the hoist hydraulic cylinder 46 and the rod end 86 of the stick hydraulic cylinder 44. An operator input device 64 provides an interface for receiving operator commands for movement of the boom tip. In this regard, for example, velocity input commands may be distinguished from commands directly specifying a target position, or scalar speed commands (including as provided with respect to input specifying a target position). An input interface 64 may be configured in various ways, including as an interface 64 with multiple input devices such as joysticks, switches, knobs, levers, wheels, and so on.

The system 100 also comprises a microprocessor 20 for computing control signals to direct flow through the hoist control valve 72, the stick control valve 74 and the straight-line control valve 78 based on a target hoist boom velocity and a target stick boom velocity derived from an input signal from the operator input device 46, and a look up chart to select a valve combination to achieve the target hoist boom velocity and the target stick boom velocity. The microprocessor 20 is coupled to the operator input device 64 (s). The microprocessor 20 can also receive inputs from the sensors (60, 62) in the electro-hydraulic system including the hoist and stick hydraulic cylinder position and potentially other sensors (angle sensors, IMUs, etc.). The connections between the microprocessor 20 and the individual sensors are not shown. The processor 20 can receive operator commands and combine them with readings from the hoist and stick boom position sensors (60, 62) wherein a velocity reading may be derived from to compute input values for the control valves (72, 74, 78) which direct hydraulic fluid 90 to achieve the commanded motion.

In one embodiment, the hoist boom position sensor 62 is a hoist cylinder position sensor that determines the length of the hoist hydraulic cylinder 46. Similarly, the stick boom position sensor 60 is a stick cylinder position sensor that determines the length of the stick hydraulic cylinder 44.

The intelligent boom control hydraulic system 100 further comprises of a counterbalance valve 76 with a first port 92 controlling flow to the rod end 86 of the stick hydraulic cylinder 44 and a second port 94 for controlling flow to the rod end 86 of the hoist hydraulic cylinder 46. The system 100 further comprises of a straight-line activation valve 79 for actuating the straight-line control valve 78 and counterbalance valve 76 to move the boom tip 105 in a generally horizontal path 165. No more than two of the control valves (i.e. the hoist control valve 72, the stick control valve 74, and the straight-line control valve 78 are active during any operation). Opening all three valves (72, 74, 78) may cause hot loops (direct line from work port to tank port) between control valves and adds uncertainty on valve flows with different control currents.

Generally, under the disclosed control system, and as discussed in greater detail herein, an operator command may be provided via an input interface 64 in order to indicate a desired movement of the boom tip 105. For example, joysticks or other devices may be actuated along various degrees of freedom to indicate desired velocities for horizontal, and vertical relative to a reference frame. Velocity commands (405, 410) for various actuators (44, 46) may be then determined in order to cause the boom tip 105 to move with the desired velocity, that the target velocities (405, 410). In this way, an operator may provide commands corresponding directly to a desired movement of the boom tip 105, without concern of the complexity of a set of corresponding movements of the actuators, which may vary considerably, for a desired movement of the boom tip, depending upon the current orientation of the boom assembly 38. Accordingly, for example, identical input commands from an operator may cause horizontal (or other) movement of the boom tip 105 with identical velocities, regardless of the current orientation or positioning of the hoist boom 40 and the stick boom 24 of the boom assembly 38. The operator command comprises a first command from a first operator input device 64a and a second command and second operator input device 64b, the first command enabling the operator to move the boom tip 105 in a vertical direction 167, and the second command enabling the operator to move the boom tip 105 in a generally horizontal path 165.

The system 100 when extending the hoist hydraulic cylinder 46 and extending the stick hydraulic cylinder 44 simultaneously, the hoist control valve 72 couples the hydraulic fluid pump 82 to the base end 88 of the hoist hydraulic cylinder 46 and the stick control valve 74 couples the hydraulic fluid pump 82 to the base end 88 of the stick hydraulic cylinder 46.

The system 100 when retracting the hoist hydraulic cylinder 46 and retracting the stick hydraulic cylinder 44 simultaneously, the hoist control valve 72 couples the hydraulic fluid pump 82 to the rod end 86 of the hoist hydraulic cylinder 46 and the stick control valve 74 couples the hydraulic fluid pump 82 to the rod end 86 of the stick hydraulic cylinder 44.

The system 100 when retracting the hoist hydraulic cylinder 46 and extending the stick hydraulic cylinder 44 simultaneously, the hoist control valve 72 couples the hydraulic fluid pump 82 to the rod end 86 of the hoist hydraulic cylinder 46 activating the counterbalance valve 76 and allowing hydraulic fluid 90 to flow from the base end 88 of the hoist hydraulic cylinder 46 to the base end 88 of the stick hydraulic cylinder 44 extending the stick hydraulic cylinder and pushing the hydraulic fluid 90 from the rod end 86 of the stick hydraulic cylinder 44 through the straight-line control valve 78 to the hydraulic reservoir 84.

The intelligent boom control hydraulic system of claim 1, wherein when retracting the stick hydraulic cylinder 44 and extending the hoist hydraulic cylinder 46 simultaneously, the stick control valve 74 couples the hydraulic fluid pump 82 to the rod end 86 of the stick hydraulic cylinder 44 activating the counterbalance valve 76 and allowing hydraulic fluid 90 to flow from the base end 88 of the stick hydraulic cylinder 44 to the base end 88 of the hoist hydraulic cylinder 46 extending the hoist hydraulic cylinder 46 and pushing hydraulic fluid 90 from the rod end 86 of the hoist hydraulic cylinder 46 through the straight-line control valve 78 to the hydraulic reservoir 84.

In the embodiment depicted, the felling head 22 is pivotally coupled to the stick boom 24 of the boom assembly 38 at the boom tip 105. A tilt hydraulic cylinder 30 is mounted to the stick boom 24 and to a linkage attached to a wrist assembly 28, such that the cylinder 30 may be actuated in order to pivot the felling head 22 about the boom tip 105. Due to the depicted assembly of the wrist assembly 28, a movement of the stick pin 26 may generally be viewed as an equivalent to a corresponding movement of the felling head 22 as a whole. In some embodiments, other actuators (not shown) may be utilized to provide other movement of the felling head 22 (e.g., rotation about an axis that is perpendicular to the stick pin 26).

Generally, a felling head 22 may include a cutting mechanism for cutting standing trees or other objects, as well as various other features. As depicted, for example, the felling head 22 includes a saw disc 36 defining a cutting plane 36 a, as well as clasping arms 34 for securing cut and un-cut trees to the felling head 22. Other end effectors may include other mechanisms, including mechanisms for tasks other than cutting and clasping. Similarly, other end effectors may include features that define a different reference plane. For this application, the straight-line control of the boom tip 105 with the intelligent boom control hydraulic system 100 advantageously enables a horizontal cut when felling trees with smooth transitions as it traverses horizontally.

The feller buncher, includes one or more pumps 82, which may be driven by an engine (not shown) of the feller buncher. Hydraulic fluid flow from through pumps 48 may be routed through various conduits (e.g., flexible hoses) in order to move one or more of the cylinders 30, 44, and 46. Flow from the pumps 82 may also power rotation of the saw disc 36, or various other components of the feller buncher. The flow from the pumps 82 is controlled through the valves as shown in FIG. 3, in order to cause movement of the cylinders 44 and 46 with different velocities. In this way, for example, a target velocity for a particular cylinder for achieving movement of the boom tip 105 may be implemented by various velocity output commands to the pumps 82, and valves (44, 46).

Purpose of intelligent boom control felling head leveling is to keep the boom tip 105 constant relative to machine frame 42 during operation.

Figure 4:
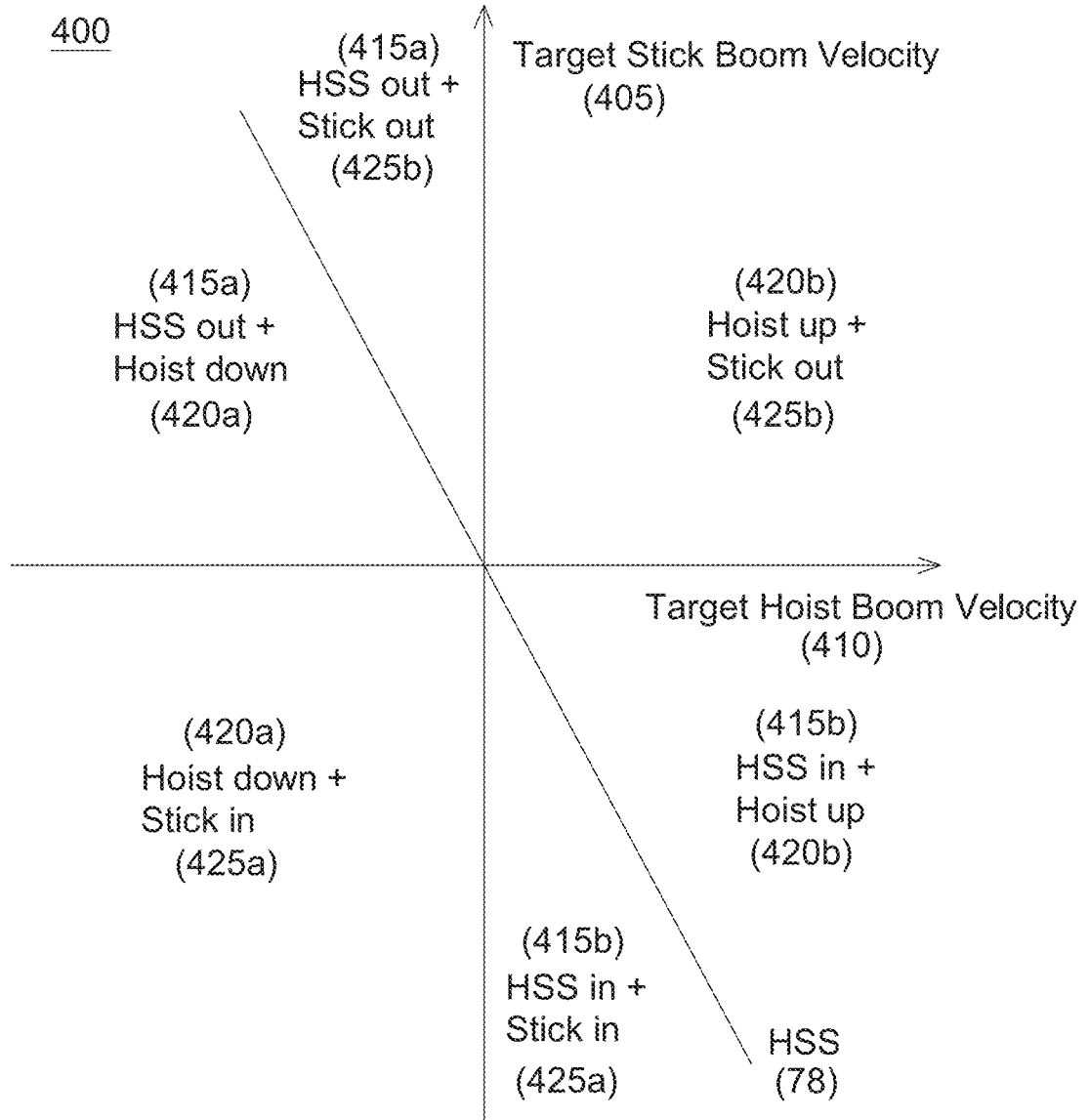
FIG. 4 is the look up chart for valve combination selection for the intelligent boom control hydraulic system with straight-line control.

Now turning to the chart in FIG. 4, and as previously discussed the operator commands from the first operator input device 46a and the second operator input device 46b are converted to the target boom tip 105 movement speed and direction. Based on this, the intelligent boom control hydraulic system 100 converts the target boom tip movement speed and direction along with the current poise of the boom assembly 38 (i.e. the position of the boom assembly derived from the stick boom position sensor 60 and the hoist boom position sensor 62), to a target hoist boom velocity 410 (i.e. hydraulic cylinder 46) and a target stick boom velocity 405 (i.e. hydraulic cylinder 44). FIG. 4 shows how the intelligent boom control hydraulic system 100 selects valve combinations that produce the desired target velocities (405, 410).

Each point on x and y look up chart 400 represents a hydraulic cylinder velocity (405, 410) combination, wherein the target hoist cylinder velocity 410 is on the x-axis and stick hydraulic cylinder velocity 405 is on the y-axis. Target velocity combination coordinates are placed on the chart 400 and the control valve combination is selected based on the section location of that point. If only a hoist hydraulic cylinder 46 or stick hydraulic cylinder 44 is supposed to be moved, then the system 100 uses only hoist control valve 72 or stick control valve 74. If a target velocity speed combination lands on the diagonal line labeled as HSS (i.e. the hydraulic straight-line system) which represents both stick hydraulic cylinder 44 movements and the hoist hydraulic cylinder movements 46, then only the straight-line control valve 78 is used.

If the target velocity combination coordinates (405, 410) fall in the top left corner labeled as HSS out (415a) and stick out (425b), then only the straight-line control valve 78 and the stick control valve 74 are used to move boom tip 105 in a substantially horizontal direction 165 away from the frame 42. In this scenario, the hoist control valve 72 is not used. If the target velocity combination coordinates fall in the top left corner labeled as HSS out (415a) and hoist down (420a), then only the straight-line control valve 78 and the hoist control valve 72 are used to move boom tip 105 in a substantially horizontal direction 165 away from the frame 42. In this scenario, the stick control valve 74 is not used.

If the target velocity combination coordinates (405, 410) fall in the bottom right corner labeled as HSS in (415b) and stick in (425a), then only the straight-line control valve 78 and the stick control valve 74 are used to move boom tip 105 in a substantially horizontal direction 165 towards the frame 42. In this scenario, the hoist control valve 72 is not used. If the target velocity combination coordinates fall in the bottom right corner labeled as HSS in (415b) and hoist up (420b), then only the straight-line control valve 78 and the hoist control valve 72 are used to move boom tip 105 in a substantially horizontal direction 165 towards from the frame 42. In this scenario, the stick control valve 74 is not used.

If the target velocity combination coordinates (405, 410) fall in the top right corner labeled hoist up (420b) and stick out (425b), then only the hoist control valve 72 and the stick control valve 74 are used. Likewise, if the target velocity combination coordinates (405, 410) fall in the bottom left corner labeled hoist down (420a) and stick in (425a), then only the hoist control valve 72 and the stick control valve 74 are used.

When selecting valve combinations in adjacent sections there must be continuity with no abrupt jumps in valve commands. Both valves cannot be changed at same time because it would be impossible to maintain high cylinder speeds during combination switch. Thus no more than two valves are used at any time during operation.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. An intelligent boom control hydraulic system for a feller buncher having a hoist boom and a stick boom coupled to the hoist boom, the intelligent boom control hydraulic system comprising:

a hoist hydraulic cylinder for raising and lowering the hoist boom, the hoist hydraulic cylinder having a rod end and a base end;

a stick hydraulic cylinder for raising and lowering the stick boom, the stick hydraulic cylinder having a rod end and base end;

a hoist boom position sensor providing hoist boom position readings;

a stick boom position sensor providing stick boom position readings;

a hydraulic fluid pump;

a hydraulic reservoir including hydraulic fluid;

a hoist control valve controlling flow from the hydraulic pump to the base end of the hoist hydraulic cylinder, and controlling flow from the rod end of the hoist hydraulic cylinder to the hydraulic reservoir;

a stick control valve controlling flow from the hydraulic pump to the base end of the stick hydraulic cylinder, and controlling flow from the rod end of the stick hydraulic cylinder to the hydraulic reservoir;

a straight-line control valve for coupling the rod end of the hoist hydraulic cylinder and the rod end of the stick hydraulic cylinder;

an operator input device for input of an operator commands; and a controller comprising a microprocessor and memory, the controller being in communication with the operator input device, the hoist boom position sensor, and the stick boom position sensor, the controller being operable to:

determine a target hoist boom velocity and a target stick boom velocity based on the operator commands, the hoist boom position readings, and the stick boom position readings;

access a look up chart stored in the memory, the lookup chart mapping valve combinations of the target hoist boom velocity and the target stick boom velocity to discrete valve-activation combinations corresponding to the hoist control valve, the stick control valve, and the straight-line control valve; and control the hoist control valve, the stick control valve, and the straight-line control valve in accordance with the selected valve-activation combination from the lookup chart, wherein the controller controls the valves such that no more than two of the hoist control valve, the stick control valve, and the straight-line control valve are simultaneously active during any operation, and wherein the selected valve-activation combinations move a boom tip along a substantially straight path relative to a machine frame of the feller buncher.

2. The intelligent boom control hydraulic system of claim 1, wherein the hoist boom position sensor comprises a hoist cylinder position sensor determining a length of the hoist hydraulic cylinder.

3. The intelligent boom control hydraulic system of claim 1, wherein the stick boom position comprises a stick cylinder position sensor determining a length of the stick hydraulic cylinder.

4. The intelligent boom control hydraulic system of claim 1, further comprises a counterbalance valve with a first port controlling flow to the rod end of the stick hydraulic cylinder and a second port controlling flow to the rod end of the hoist hydraulic cylinder.

5. The intelligent boom control hydraulic system of claim 4, further comprising a straight-line activation for selectively actuating the straight-line control valve and the counterbalance valve to enable movement of the boom tip in a generally horizontal path.

6. The intelligent boom control hydraulic system of claim 4, wherein, when retracting the target hoist boom velocity indicates retraction of the hoist hydraulic cylinder and the target stick boom velocity indicates extension of the stick hydraulic cylinder simultaneously, the controller selects a valve-activation combination that activates the straight-line and the hoist control valve, thereby allowing hydraulic fluid to flow from the base end of the hoist hydraulic cylinder to the base end of the stick hydraulic cylinder through the counterbalance valve.

7. The intelligent boom control hydraulic system of claim 4, wherein, when the target stick boom velocity indicates retraction the stick hydraulic cylinder and the target hoist boom velocity indicates extension extension of the hoist hydraulic cylinder simultaneously, the controller selects a valve-activation combination that activates the straight-line control valve and the stick control valve, thereby allowing hydraulic fluid to flow from the base end of the stick hydraulic cylinder to the base end of the hoist hydraulic cylinder through the counterbalance valve.

8. The intelligent boom control hydraulic system of claim 1, wherein the operator commands comprise:

a first command from a first operator input device and a second command from a second operator input device, the first command enabling an operator to move the boom tip in a vertical direction, and the second command enabling the operator to move the boom tip in a generally horizontal path.

9. The intelligent boom control hydraulic system of claim 1, wherein when the target hoist boom velocity and the target stick boom velocity indicate simultaneous extension of the hoist hydraulic cylinder and the stick hydraulic cylinder, the controller then selects a valve-activation combination that activates the hoist control valve and the stick control valve while the straight-line control valve remains inactive.

10. The intelligent boom control hydraulic system of claim 1, wherein when the target hoist boom velocity and the target stick boom velocity indicate simultaneous retraction of the hoist hydraulic cylinder and the stick hydraulic cylinder, the controller selects a valve-activation combination that activates the hoist control valve and the stick control valve while the straight-line control valve remains inactive.

* * * * *